(12) United States Patent
Ha et al.

(10) Patent No.: US 7,387,808 B2
(45) Date of Patent: Jun. 17, 2008

(54) PERSIMMON VINEGAR POWDER AND PROCESS FOR PREPARING THE SAME

(75) Inventors: Yong-Gil Ha, Chung Chungbuk-do (KR); Hee-Do Hong, Kyunggi-do (KR); Bu-Yong Lee, Kyunggi-do (KR); Sung-Soo Kim, Kyunggi-do (KR); Kyung-Tack Kim, Seoul Metro (KR)

(73) Assignee: Bonglim Co., Ltd., Chungbuk-do (KR)

( * ) Notice: Subject to any disclaimer, the term of this patent is extended or adjusted under 35 U.S.C. 154(b) by 912 days.

(21) Appl. No.: 10/204,768

(22) PCT Filed: Feb. 26, 2001

(86) PCT No.: PCT/KR01/00291

§ 371 (c)(1),
(2), (4) Date: Jul. 6, 2004

(87) PCT Pub. No.: WO01/64043

PCT Pub. Date: Sep. 7, 2001

(65) Prior Publication Data

US 2004/0253343 A1     Dec. 16, 2004

(30) Foreign Application Priority Data

Feb. 29, 2000   (KR) .................... 2000-9998

(51) Int. Cl.
*A23L 1/22* (2006.01)
(52) U.S. Cl. .................. 426/17; 426/471; 426/490; 426/521; 426/638; 426/640
(58) Field of Classification Search .............. 426/17, 426/471, 490, 521, 638, 640
See application file for complete search history.

(56) References Cited

FOREIGN PATENT DOCUMENTS

| JP | 59-125840 A | * | 7/1984 |
| JP | 61-257179 A | * | 11/1986 |
| JP | 8-116897 A | * | 5/1996 |
| JP | 9-28322 A | * | 2/1997 |

* cited by examiner

*Primary Examiner*—Helen F Pratt
(74) *Attorney, Agent, or Firm*—Egbert Law Offices

(57) ABSTRACT

The invention relates to process for preparing persimmon vinegar, in which persimmon extract is added to persimmon concentrate to obtain a mixture and then the mixture is spray dried; and vinegar powder having a taste and a smell convenient to eat, produced by the process. The persimmon vinegar powder is prepared by concentrating persimmon vinegar to 12~18° BX using vacuum concentrator to obtain a concentrate of persimmon vinegar; adding 15~30 weight % of extract of persimmon leaf and 5~9 weight % of cyclodextrin, based on the weight of the concentrate, to the concentrate to obtain a solution and then stirring the solution; dissolving 1~5 weight % of lactose, 25~35 weight % of maltodextrin, and 5~9 weight % of gum, based on weight of the concentrate, in the stirred solution and homogenizing the solution: and spray drying the homogenized solution to obtain a powder. According to the present invention, a sour taste of persimmon vinegar is eliminated and a characteristic flavor of persimmon leaf is added, which lead to prepare persimmon vinegar powder having improved preference, and also prepare standard and economical persimmon vinegar powder by use of the concentrate. The method may prepare vinegar powders from vinegar, which is made from numerous fruits and vegetables such as grape, apricot, plum, garlic, etc. In some cases, Chineses matrimony vine, Maximowiczia chinensis and pine needle may be added.

2 Claims, 3 Drawing Sheets

PERSIMMON VINEGAR POWDER AND PROCESS FOR PREPARING THE SAME

TECHNICAL FIELD

The invention relates to persimmon vinegar powder and process for preparing the same. More particularly, the invention relates to process for preparing persimmon vinegar, in which persimmon extract is added to persimmon concentrate to obtain a mixture and then the mixture is spray dried; and vinegar powder having a taste and a smell convenient to eat, produced by the process. The process inhibits loss of active ingredients of the persimmon vinegar powder.

BACKGROUND ART

Persimmon (*Diasoyros kaki*), which is a nutritious and alkaline fruit, contains 11~15% of sugar such as fructose and glucose, about 20~50 mg/100 g (edible portion) of vitamin C, which is about 5~12 times as much as that of apple, and more minerals than apple. Additionally, persimmon contains a great quantity of vitamin A and tannic acid, the latter of which produces a bitter taste. Especially, tannic acid is known to remedy diarrhea or stomach disorder, as well as lower the blood pressure without affecting an electrocardigram. Accordingly, many of research in persimmon, as both food and medicine, are actively going on.

Amount of persimmon produced in domestic was about 155,111 ton (in 1992), but has been increasing yearly to about 239,570 ton in 1997. Also, cultivation area of persimmon is increasing yearly. Because the persimmon has a higher profitability than other fruit, e.g., apple, significant increasing of its cultivation area is expected. Thus, there is a need for the development of persimmon for use as both food and medicine.

Meanwhile, persimmon vinegar has been produced for a long time, in order to obtain maximally the effect of the beneficial nutrients in persimmon. Persimmon vinegar is described as "new fruit vinegar" in the literature of [San-Lim Kyun-je, published in the late Chosun Dysnasty]. Vinegar is a widely used seasoning, and its constituents has been known to have important influences on the human metabolism, since Krebs (U.S.A) and Kipman (England) reported the TCA cycle theory in 1953.

Vinegar contains a great quantity of organic acids involved in the TCA cycle, including acetic acid, and thus smoothly activates the TCA cycle without accumulating a lactic acid in body. Therefore, the vinegar is effective to refresh and makes the blood a weak alkali. Such vinegar has been made from numerous fruits and grains. Of these, persimmon vinegar has a better flavor than others (for example, apple vinegar, brown rice vinegar, etc.). The persimmon vinegar also contains a great quantity of tannin, which is a polyphenolic compound, and thus lowers the blood pressure and strengthens blood vessels. The persimmon vinegar also contains a great quantity of acetic acid as main component and other organic acids involved in TCA cycle, which make it good for refreshment, increase appetite and prevent numerous adult diseases.

Despites the fact that persimmon vinegar is a traditional fermented seasoning, there are few studies of persimmons and persimmon vinegar. But today, as the interest in health food is increased, it began to study pharmacological components of persimmon and standard method for preparing the persimmon vinegar. Sugahara et al. studied a preference for persimmon beverages (reference: Sugahara, T., et al., The preference for Kaki beverage. Nippon Shokuhin Kogyo Gakkaishi, 33(4), 281-284, 1987). Nakashima et al. produced persimmon vinegar using an *Acetobacter*, which isolated from persimmon during fermentation of the persimmon, and studied changes in the composition of the persimmon vinegar (reference: Nakashima, M., et al., Changes in the composition of persimmon vinegar induced by *Acetobacter* sp. isolated from "Sanja" persimmon fruits during the fermentation; Nippon Shokuhin Kohyo Gakkaishi, 34(12). 818-825, 1987). Nippon patents relating to persimmon vinegar include a method for producing alcohol beverage using persimmon (reference: Nippon nonexamined patent No. 56-25104), and a method for preparing persimmon vinegar that reduces alcohol concentration in blood (reference: Nippon nonexamined patent No. 61-224980).

There is a report that superior strain producing an acetic acid is isolated and cultivated with stirring to obtain persimmon vinegar having an acidity of 5%, in Korea (ref: Won Sub CHA, Joon hee PARK, Jin Gu KIM; Study of production of persimmon vinegar, 20, 29-32, 1980, in articles of Sang-ju Agricultural Specialized University). Also, there has been a study of development of instant vinegar, in which major microorganism involved in fermentation of persimmon vinegar is isolated from persimmon vinegar and then identified, and concentration of acetic acid is assayed (ref: Myung Chan KIM et al., Production of vinegar using persimmon, Korean Industrial Microbiology, 8(2), 103-111, 1980). Also, there has been continuous studies of production of persimmon vinegar, including study of production of persimmon vinegar using Saccharomyces cerevisiae FWKS 260 yeast and *Acetobacter aceti* (ref.: Choong Yeon WON et al., Study of development of instant vinegar using persimmon, Korean Nutritional Food Academic Committee Fall Thesis Presentations, p. 55, 1994), and study of production of vinegar using persimmon which deteriorated due to low temperature storage (ref: Korean Nutritional Food Academic Committee, 25(1), 123-128, 1996). Korean patents relating to persimmon vinegar include a method for preparing persimmon vinegar (Korean Patent Publication Nos. 93-008120, 98-151732, and Korean Patent Appln. No. 98-002239), a method for producing a galenical preparation using persimmon vinegar (Korean Patent Open-laid No. 96-028915), a method for preparing instant persimmon vinegar (Korean Patent Publication No. 98-149279), method for preparing beverage composition containing persimmon vinegar (Korean Patent Open-laid No. 97-032521), and a method for preparing persimmon vinegar using a fertile egg of white silky fowl (Korean Patent Open-laid No. 97-074922). However, all these previous studies are limited to the production of persimmon vinegar or simple application of already-produced persimmon vinegar to beverages, and fail to extend to the study of the technique for processing persimmon vinegar into beverage convenient to drink.

Now, persimmon vinegar is used as sour seasoning for cooking in Korea, but major use of the persimmon vinegar is to directly drink it as health food. In such case, it is general to dilute it and directly drink it with honey. However, even though it is diluted, characteristic strong sour taste and smell of the persimmon vinegar make it very difficult and substantially painful to drink. Also, since being in liquid form, it is inconvenient to carry and difficult to use as an ingredient for cooking. Accordingly, there is a need for the development of technique capable of overcoming these disadvantages. That is to say, persimmon vinegar, having acidity of approximately 4%, generally has strong smell and taste of its own and thus is inadequate to directly drink in terms of preference. Also, liquid form of the persimmon vinegar limits handling of the vinegar, blending with other food, as well as its application and use. Therefore, it is attempted to pulverize persimmon vinegar, in order to overcome such disadvantages.

Korean Patent Open-laid No. 98-000188 describes a method for preparing persimmon vinegar powder, in which molecules of the persimmon vinegar is entrapped using a entrapping property of dextrin, smell of the persimmon vinegar is entrapped using a gum, and then persimmon vinegar as above is dried. However, the above method is a merely one which a general method for pulverizing liquefied material is applied to persimmon vinegar. The method has a difficulty in properly alleviating a sour taste of persimmon vinegar or entrapping a smell of its own. The method also comprises the step of pretreating or aging persimmon vinegar in a sealed container, which makes processing of the vinegar complex and requires a considerable time. Thus, the method is inadequate for pulverization of persimmon vinegar. Also, since the method uses a stock solution of persimmon vinegar, the used container has to be very large, concentration of persimmon vinegar in persimmon vinegar powder is very low and concentration fluctuation of persimmon vinegar is very severe. Especially, the sour taste of the persimmon vinegar powder, which prepared by the method is not adequately masked, and thus problems of prior liquefied persimmon vinegar still remain, when consuming the persimmon vinegar powder. Therefore, there is a need for techniques, which can control taste and smell of the persimmon vinegar so that it can be consumed directly, and inhibit a loss of active ingredients of vinegar, as well as prepare persimmon vinegar powder of good quality in a standard and convenient way.

Therefore, we make an effort to pulverize persimmon vinegar to make it easy to consume. In result, we found that when extract of persimmon leaf and the other excipients are added to a concentrate of persimmon vinegar to obtain a mixture, and then the mixture is pulverized, sour taste of persimmon vinegar can be eliminated and the characteristic flavor of persimmon leaf is added, which lead to prepare persimmon vinegar powder having an enhanced preference. We also found that standard and economical persimmon vinegar powder can be produced by use of the concentrate of persimmon vinegar, so as to complete the present invention.

DISCLOSURE OF INVENTION

It is, therefore, an object of the invention to provide a method for preparing persimmon vinegar powder, by making a concentrate from persimmon vinegar, adding extract of persimmon leaf and the other excipients to the concentrate to obtain mixture, and stirring, homogenizing and spray drying the mixture successively.

It is another object of the invention to provide persimmon vinegar powder that can be produced by the method.

BEST MODE FOR CARRYING OUT THE INVENTION

The present persimmon vinegar powder is produced by a method, comprising the steps of (i) concentrating persimmon vinegar to 12~18° BX using vacuum concentrator to obtain a concentrate of persimmon vinegar; (ii) adding 15~30 weight % of extract of persimmon leaf and 5~9 weight % of cyclodextrin, based on the weight of the concentrate, to the concentrate to obtain a solution and then stirring the solution; (iii) dissolving 1~5 weight % of lactose, 25~35 weight % of maltodextrin, and 5~9 weight % of gum, based on weight of the concentrate, in the stirred solution and homogenizing the solution: and (iv) spray drying the homogenized solution to obtain a powder.

A method for preparing persimmon vinegar powder will now be more specifically described in stepwise.

1. The First Step: Process for Obtaining a Concentrate of Persimmon Vinegar

The persimmon vinegar is concentrated to 12~18° BX, in order to obtain a concentrate of persimmon vinegar. The persimmon vinegar is any persimmon vinegar based on persimmon, including commercially available persimmon vinegar or persimmon vinegar made by direct fermentation of persimmon at home. The persimmon vinegar is firstly concentrated to 12~18° BX, preferably 14~16° BX, in order to standardize the process, inhibit a volumic increasing of intermediate produced during the process, and provide the best pulverizing condition in which the active ingredients of the persimmon vinegar can be retained as it is. We ascertained that the concentration of persimmon vinegar most suitable to retain the active ingredients as it is, was approximately 15° BX, by analyzing the chromacity, viscosity, pH, acidity and content of organic acid.

2. Second Step: Stirring Process

15~30 weight % of extract of persimmon leaf and 5~9 weight % of cyclodextrin, based on weight of the concentrate of the persimmon vinegar (obtained from the first step), are added to the concentrate with stirring. The extract of persimmon leaf is added to alleviate the sour taste of persimmon vinegar and enhance characteristic flavor and taste of persimmon leaf. The extract of persimmon leaf is prepared by the steps of washing the persimmon leaves, steaming it at 100~120° C. for 1~10 minutes and then drying it for 1~2 hours using a hot blast at 35~50° C.; adding 8~12 liters/kg (dried persimmon leaves) of water to the dried leaves, extracting the leaves at 90~100° C. for 10~30 minutes, and then compression filtering the extract using bag filter to obtain only liquid; and concentrating the liquid to 12~18° BX using vacuum concentrator. The use of extract of persimmon leaf having same concentration as that of concentrate of persimmon vinegar can standardize a process, and when the extract is spray dried, powder of a good quality can be obtained. Also, cyclodextrin is added to entrap the taste and smell of persimmon vinegar. It is most preferable to use cyclodextrin that efficiently entraps the smell.

3. Third Step: Homogenizing Process

When the mixed solution is sufficiently stirred by the second step, 1~5 weight % of lactose, 25~35 weight % of maltodextrin, and 5~9 weight % of gum, based on weight of concentrate of persimmon vinegar, are dissolved in the stirred mixed solution, and the solution is homogenized. The lactose is added to alleviate the sour taste of persimmon vinegar, and the lactose significantly softens the biting sour taste of persimmon vinegar. Also, the maltodextrin is added to aid pulverization of the vinegar, and the gum is added to prevent moisture-absorption of the vinegar powder and impart gloss to the powder. As the gum, one or more selected from carrageenan, agar, alginate, guar gum, gum arabic, rocust bean gum, xanthan gum, pectin and carboxymethyl cellulose, etc. are added according to their weights. It is preferable to use gum arabic. Homogenizing is effected using a high-pressure homogenizer at the temperature of 0~20° C. for 2~10 minutes so that the mixed solution is homogeneously mixed. Hereby, homogenized solution is obtained.

4. Fourth Step: Spray Drying Process

The homogenized solution obtained from the third step is spray dried using spray drier to obtain persimmon vinegar powder. The spray drying is effected using spray drier under conditions of inlet air temperature of 150~180° C., outlet air temperature of 80~100° C. and atomizer speed of 15,000~25,000 rpm, while the homogenized solution being infused at the rate of 20~40 ml/min. By the spray drying, a pale brown, flowing persimmon vinegar powder of good quality can be obtained.

The following examples further illustrate the present invention. Theses examples are presented only for the purpose of illustrating the invention, and the skilled artisan will appreciate that these non-limiting examples are presented only for the purpose of specifically explaining the invention. In examples, persimmon vinegar is described as example, but vinegars made from numerous fruits or vegetables, such as grape, apricot, plum, garlic, and etc. are also included in the scope of the invention.

EXAMPLE 1

Analysis of Physicochemical Characteristics of a Concentrate of Persimmon Vinegar Various concentration of concentrates of persimmon vinegar were produced from the persimmon vinegar, and each concentrate was analyzed and evaluated for physicochemical characteristics such as chromacity, vicosity, acidity, as well as ingredients of organic acid and aromatics, in order to find out a concentration of persimmon vinegar most suitable to produce persimmon vinegar powder. We measured a solid content of stock solution of commercially available persimmon vinegar (100% persimmon, acidity of below 4%, Dae Yang Co.) using saccharometer (Atago Japan) to find out its solid content to be 5.4° BX. Also, the stock solution of persimmon vinegar was vacuum concentrated to make concentrates of persimmon vinegar with concentrations of 20° BX, 30° BX, 40° BX, 50° BX, 60° BX and 70° BX at 55° C. Also, condensates obtained in making of concentrates of 20° BX and 40° BX, were collected separately and used as analytical samples.

EXAMPLE 1a

Chromacity of Concentrates of Persimmon Vinegar

The concentrates of persimmon vinegar of 20° BX, 30° BX, 40° BX, 50° BX, 60° BX and 70° BX were equally diluted into a concentration of 5.4° BX, so as to obtain samples of concentrates of persimmon vinegar with concentrations of 5.4° BX. The 5.4° BX stock solution, the samples of concentrates (with concentration of 5.4° BX), and the condensates collected in Example 1 were measured for lightness (L), redness (a) and yellowness (b) using color and color difference meter (HunterLab ColorQuest II, USA). Also, the measured values were compared with those of unconcentrated stock solution of persimmon vinegar to obtain color differences (ΔE ab), thereby colors change according to concentrations being investigated (see Table 1). The standard white board used for comparison has a lightness, redness and yellowness of 92.68, 0.81 and 0.86, respectively (ref: Jae Chul SONG, Hyun Jung PARK, Study of Food Material Science, UI San University Press, Ulsan, p. 80-84, 1995).

TABLE 1

| color differences of concentrates of persimmon vinegar shown by ΔE ab | |
|---|---|
| ΔE ab value | Color differences |
| 0~0.5 | Very little difference (almost none) |
| 0.5~1.5 | Little difference |
| 1.5~3.0 | Just discernable difference |
| 3.0~6.0 | Noticeable difference |
| 6.0~12.0 | Considerably noticeable difference |
| More than 12 | Classified as a difference color |

As described above, we measured the chromacity of concentrates of persimmon vinegar, and find out that the stock solution of persimmon vinegar has lightness and a yellowness of 56.48 and 17.95, respectively, which show a slight brown color. However, when the stock solution was concentrated to a concentration of 20° BX, its lightness and yellowness were decreased to 12.39 and 5.48 respectively, which show a dark brown color, even though the 20° BX concentrate was diluted to same concentration as the stock solution (see Table 2). Also, the 20° BX concentrate showed color difference of 45.729 compared with that of stock solution. These confirmed the fact that concentration of persimmon vinegar induced change of color, and the more concentration was progressed, more lightness and yellowness were decreased, thereby the color of persimmon vinegar being changed into a darker and deeper color. Also, these mean that even though persimmon vinegar is concentrated at a lower temperature of 55° C. by vacuum concentration, significant browning is occurred, and that it is preferable to concentrate it into a desired concentration at a low temperature in a shortime, in order to maintain a color of persimmon as it is.

TABLE 2

The chromacity of concentrations of persimmon vinegar according to their concentrations

| | Lightness (L) | Redness (a) | Yellowness (b) | Color difference (ΔE ab) |
|---|---|---|---|---|
| 5.4° BX stock solution | 56.48 | 3.16 | 17.95 | |
| 20° BX concentrate diluted to 5.4° BX | 12.39 | 2.44 | 5.84 | 45.729 |

TABLE 2-continued

The chromacity of concentrations of persimmon vinegar according to their concentrations

|  | Lightness (L) | Redness (a) | Yellowness (b) | Color difference (ΔE ab) |
|---|---|---|---|---|
| 30° BX concentrate diluted to 5.4° BX | 9.26 | 1.97 | 4.53 | 49.104 |
| 40° BX concentrate diluted to 5.4° BX | 8.61 | 1.96 | 4.20 | 49.820 |
| 50° BX concentrate diluted to 5.4° BX | 6.68 | 2.15 | 3.77 | 51.789 |
| 60° BX concentrate diluted to 5.4° BX | 5.64 | 2.42 | 3.32 | 52.908 |
| 70° BX concentrate diluted to 5.4° BX | 4.40 | 3.09 | 2.87 | 54.219 |
| Condensate obtained in making of 20° BX concentrate | 96.01 | −0.44 | 0.53 |  |

EXAMPLE 1b

Viscosity of the Concentrate of Persimmon Vinegar

Figure 1:
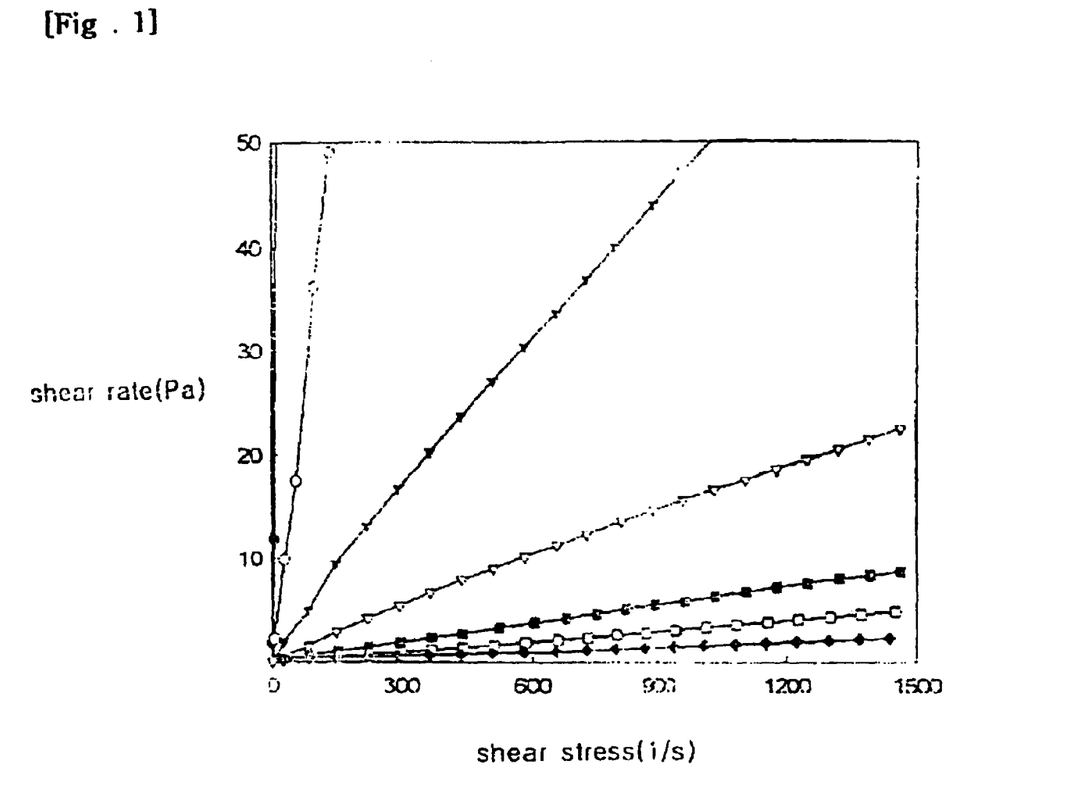
FIG. 1 is a graph illustrating a viscosity change according to the concentration of the persimmon vinegar concentrate.
Figure 2:
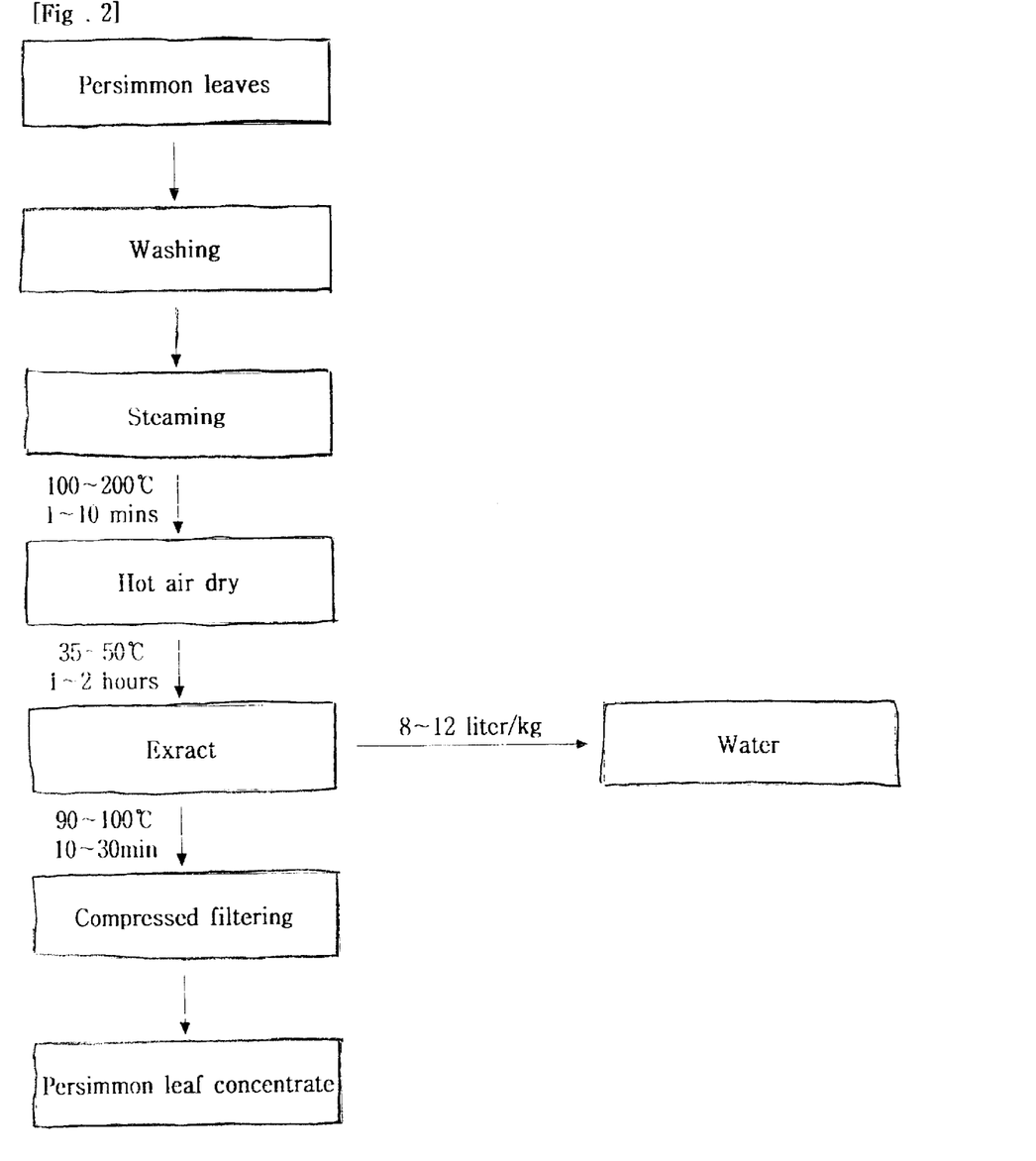
FIG. 2 is a block diagram schematically illustrating the process for making extract of persimmon leaf.
Figure 3:
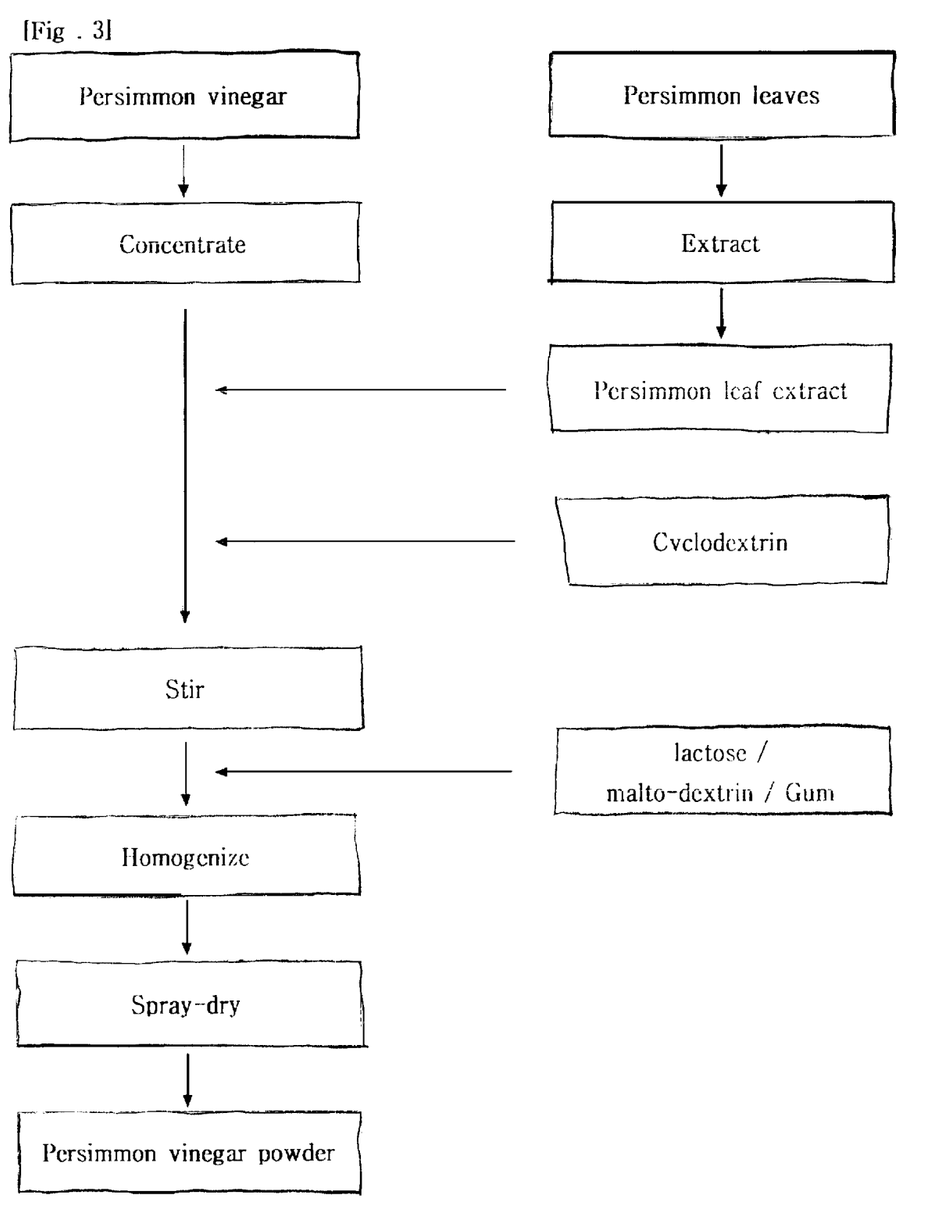
FIG. 3 is a block diagram schematically illustrating the process for making persimmon vinegar powder.

Apparent viscosities of the 5.4° BX stock solution, and 20° BX, 30° BX, 40° BX, 50° BX, 60° BX and 70° BX concentrates were measured using a cylindrical viscosimeter (Haake RV20, UK). We measured a change of shear stress while the shearing rate was increased from 0 $s^{-1}$ to 1,500 $s^{-1}$ at 20° C. for 1 minute, and investigated the flowing characteristic and apparent viscosity of fluid (ref.: Hee Don CHOI et al., The Rheology characteristics of pear juice, Korean Food Science Academic Magazine, 27(6), 845-854, 1995). The change of apparent viscosities of 5.4° BX stock solution and the above concentrates according to their concentrations is shown in FIG. 1. In the FIG. 1, (◆) represents flowing characteristic of 5.4° BX stock solution of persimmon vinegar, (□) represents that of 20° BX concentrate of persimmon vinegar, (■) represents that of 30° BX concentrate of persimmon vinegar, (∇) represents that of 40° BX concentrate of persimmon vinegar, (▼) represents that of 50° BX concentrate of persimmon vinegar, (○) represents that of 60° BX concentrate of persimmon vinegar, and (●) represents that of 70° BX concentrate of persimmon vinegar. As shown in FIG. 1, in case of the stock solution, 20° BX concentrate and 30° BX concentrate, shear stresses were increased slowly as concentrations of the concentrates were increased. Also, these solutions showed linear Newtonian flowing characteristic. However, in case of 40° BX, 50° BX, 60° BX and 70° BX concentrates, shear stresses were increased sharply as concentrations of the concentrates were increased. Also, these concentrates showed pseudoplastic flowing characteristic. When considering a concentration of 30° BX as a standard, difference between concentrates (or solution) below 30° BX and concentrates exceeding 30° BX, in apparent viscosity (shearing ability/shearing rate, linear slope) at shearing rate of 600 $s^{-1}$ was significant. Therefore, concentrates having high concentrations exceeding 30° BX had very high viscosities, and had a difficulty in transporting and handling. Also, concentrates having low concentrations below 30° BX seemed to be suitable to make a manufacturing process efficient and simplify the process.

EXAMPLE 1c pH and Acidity of Concentrates of Persimmon Vinegar

The pH and acidity of 5.4° BX stock solution, and 5.4° BX samples obtained by diluting 20° BX, 30° BX, 40° BX, 50° BX, 60° BX and 70° BX concentrates into 5.4° BX, as well as condensate obtained in making a 20° BX concentrate were directly measured using pH meter (Orion SA520, USA). Appropriate amount of samples were taken from the solutions, and pH electrode was immersed in the samples. And then, 1.0 N NaOH solution was added to the sample until pH of the sample was 8.1(±0.2) at ambient temperature. The acidity was calculated by converting the used amount of 1.0 N NaOH solution into amount of acetic acid using the following equation (1 ml of 1.0 N NaOH solution=0.06 g of acetic acid): acidity (%)=[0.06 g×the used amount (ml) of 1.0 N NaOH solution]×100/(weight of sample (g)) (See Table 3). As shown in Table 3, the pH and acidity of 5.4° BX stock solution before concentration were 3.81 and 5.00 respectively, but pH was increased and acidity was decreased as the concentration of the solution was increased. As the result, the 70° BX concentrate had pH and acidity of 4.66 and 1.04 respectively. The condensate (2.6° BX) had a very low pH of 2.71, and very high acidity of 4.29 respectively. This confirmed the fact that a quantity of acids was released into condensate when the solution was concentrated. Therefore, vacuum concentration of persimmon vinegar that removes the biting smell and taste appropriately is to be effected as less as possible, provided that the vacuum concentration is effected until concentration of persimmon vinegar reaches a level required for spray drying.

TABLE 3

The pH and acidity of concentrates of persimmon vinegar

|  | pH | Acidity |
|---|---|---|
| 5.4° BX stock solution of persimmon vinegar | 3.81 | 5.00 |
| 20° BX concentrate diluted to 5.4° BX | 4.23 | 2.54 |
| 30° BX concentrate diluted to 5.4° BX | 4.34 | 2.02 |
| 40° BX concentrate diluted to 5.4° BX | 4.43 | 1.65 |
| 50° BX concentrate diluted to 5.4° BX | 4.51 | 1.45 |
| 60° BX concentrate diluted to 5.4° BX | 4.58 | 1.25 |
| 70° BX concentrate diluted to 5.4° BX | 4.66 | 1.04 |
| Condensate obtained in making of 20° BX concentrate | 2.71 | 4.29 |

EXAMPLE 1d

Analysis of Organic Acids in Concentrates of Persimmon Vinegar 5.4° BX stock solution, and 5.4° BX samples obtained by diluting 20° BX, 30° BX, 40° BX, 50° BX, 60° BX and 70° BX concentrates into 5.4° BX, as well as condensate obtained in making a 20° BX concentrate were filtered through 0.25 μm membrane filter, and contents of organic acids in the solutions were analyzed with HPLC. Supelco gel (300×7.8 mm, Supelco Co.) was used as column, and 0.1% phosphoric acid was used as solvent. The contents of organic acids in the solutions were detected with UV, using acetic acid, citric acid, lactic acid, malic acid and oxalic acid as standard sample of organic acid, under conditions of moving rate of solvent of 0.5 ml/min. and temperature of 20° C. (see Table 4).

TABLE 4

The contents of organic acids in concentrates of persimmon vinegar according to concentraion of the concentrates

| | Acetic acid (%) | citric acid (%) | Lactic acid (%) | Malic acid (%) | Oxalic acid (%) |
|---|---|---|---|---|---|
| 5.4° BX original liquid | 2.342 | 0.018 | 0.177 | — | — |
| 20° BX concentrate diluted to 5.4° BX | 1.216 | 0.030 | 0.133 | — | — |
| 30° BX concentrate diluted to 5.4° BX | 1.054 | 0.033 | 0.309 | — | — |
| 40° BX concentrate diluted to 5.4° BX | 0.882 | 0.034 | 0.379 | — | — |
| 50° BX concentrate diluted to 5.4° BX | 0.751 | 0.036 | 0.404 | — | — |
| 60° BX concentrate diluted to 5.4° BX | 0.593 | 0.034 | 0.282 | — | — |
| 70° BX concentrate diluted to 5.4° BX | 0.492 | 0.028 | 0.343 | — | — |
| Condensate obtained in making of 20° BX concentrate | 2.159 | — | 0.0013 | — | — |

\* —: Undetected

As shown in Table 4, the solutions were analyzed for content of organic acids, and, as the result, acetic acid, lactic acid and citric acid were detected sequentially, and malic acid and oxalic acid were undetected. Also, the stock solution (solid content of 2.7° BX) comprised 2.342% of acetic acid, which is 86.7% of total solids. However, as the stock solution was increasingly concentrated, the contents of citric acid and lactic acid were substantially unchanged, and the content of acetic acid was significantly decreased. That is to say, while the 70° BX concentrate diluted to 2.7° BX had a decreased content (18.2%) of acetic acid in total solids, the condensate (2.6° BX) comprised 83.03% (in solids) of acetic acid. These confirmed the fact that a quantity of acids was released into condensate when the solution was concentrated. When used as seasonings, the persimmon vinegar preferably comprised high content of acetic acid, in order to provide smell and taste of own with only a little amount. However, when the persimmon vinegar is consumed directly as health food, the biting taste and smell are disadvantages. Thus, it is advantage to remove too strong taste and smell to directly consume the vinegar as up to 20° BX concentrates, and make the vinegar more susceptible for spray drying.

Putting together the Example 1 as described above, the concentration most suitable to make persimmon vinegar powder was preferably below 20° BX, particularly 12~18° BX.

EXAMPLE 2

The Preparation of Extract of Persimmon Leaf

Extract of persimmon leaf, which is added in order to alleviate the sour taste of persimmon vinegar and improve a flowing characteristic of powder, as well as increase the characteristic taste and smell of the leaf, were prepared as follows. 10 kg of persimmon leaves were washed with water in several times, dried, steamed at 110° C. for 2 minutes, and dried with a hot blast at 40° C. for 1 hours. 10 liters/kg (persimmon leaves) of water were added to the dried leaves, and the leaves were steamed at 100° C. for 20 minutes and compression filtered through bag filter to remove impurities. The obtained filtrate was concentrated to 15° BX in a vacuum concentrator at 40° C. to obtain 3000 ml of extract of persimmon leaf. The extract was stored in refrigerator at 4° C.

EXAMPLE 3

The Preparation of Persimmon Vinegar Powder and Calculation of Optimal Blending Ratio In order to establish an optional blending ratio for pulverizing of persimmon vinegar, mixed solutions of 7 different blending ratios were prepared, and spray dried with spray drier (Ohakawara L-8, Japan) to obtain powders. And then, qualities of the powders corresponding to each blending ratio were evaluated (see Tables 5 and 6). In this Example, the 15° BX and 20° BX concentrates of persimmon vinegar, as well as 15° BX extract of persimmon leaf, in which active ingredients such as organic acids, pH, and acidity has been retained as it is as possible as, and the characteristic smell and taste of persimmon has been substantially removed, were used. Cyclodextrin was added to the concentrates to form solutions, and the solutions were stirred using stirrer at 20° C. for 2 hours. Lactose, maltodextrin DE 10~20 and Gum Arabic were dissolved in the concentrates of persimmon vinegar to form solutions, and the solutions were homogenized with homogenizer at 20° C. for 5 minutes and pulverized using spray drier. Operating conditions of the spray drier were set as follows: inlet air temperature 160° C., outlet air temperature 90° C., atomizer speed 20,000 rpm, and feed rate 30 ml/min. It was confirmed that these conditions were most suitable to spray dry by a preliminary test.

TABLE 5

Blending ratios of components in persimmon vinegar powders

| Blending ratio | Concentration of persimmon vinegar (g) | Extract of persimmon leaf (g) | Cyclodextrin (g) | Lactose (g) | Maltodextrin (g) | Gum Arabic (g) |
|---|---|---|---|---|---|---|
| 1 | 20° BX, 100.0 | — | 3.0 | 4.5 | 18.0 | — |
| 2 | 20° BX, 100.0 | — | 10.5 | 7.0 | 42.0 | 10.5 |

TABLE 5-continued

Blending ratios of components in persimmon vinegar powders

| Blending ratio | Concentration of persimmon vinegar (g) | Extract of persimmon leaf (g) | Cyclo-dextrin (g) | Lactose (g) | Malto-dextrin (g) | Gum Arabic (g) |
|---|---|---|---|---|---|---|
| 3 | 20° BX, 100.0 | — | 9.0 | 6.0 | 36.0 | 9.0 |
| 4 | 20° BX, 100.0 | — | — | 7.0 | 52.5 | 10.5 |
| 5 | 20° BX, 90.0 | 15° BX, 10.0 | 7.5 | 2.5 | 32.5 | 7.5 |
| 6 | 20° BX, 80.0 | 15° BX, 20.0 | 7.5 | 2.5 | 32.5 | 7.5 |
| 7 | 20° BX, 70.0 | 15° BX, 30.0 | 7.5 | 2.5 | 32.5 | 7.5 |

TABLE 6

Qualities of the Powders having various blending ratios

| | Hygroscopic property | Specific gravity of particles | Sour taste | Powderable Characteristic |
|---|---|---|---|---|
| Powder of No. 1 blending ratio | +++++ | +++++ | +++++ | + |
| Powder of No. 2 blending ratio | ++ | +++ | +++ | ++++ |
| Powder of No. 3 blending ratio | +++ | ++ | ++++ | +++ |
| Powder of No. 4 blending ratio | ++ | +++ | ++ | +++ |
| Powder of No. 5 blending ratio | ++ | +++ | ++++ | +++ |
| Powder of No. 6 blending ratio | + | ++++ | +++ | +++++ |
| Powder of No. 7 blending ratio | + | ++++ | +++ | +++++ |

Notes
Powderable characteristic: +very bad +++++very good
hygroscopic property: +very little +++++very much
Specific gravity of particles: +relatively light +++++relatively heavy
Sour taste: +very weak +++++very strong Upon the spray dried persimmon vinegar powders of No. 1~7 blending ratios were evaluated for characteristic sour taste of persimmon vinegar, hygroscopic property, specific gravity of particles, and overall powderable characteristic, we recognized that powder of No. 1 had a strong hygroscopic property, and were too sticky to be pulverized in the spray drier. Also, some of the dried powders absorbed moisture and were sticky immediately after exposed to air, and had strong burnt smell and taste. Therefore, for powder of No. 2 blending ratio, gum arabic and cyclodextrin were additionally added to prevent a moisture-absorption, and spray dried to entrap some fresh taste and smell of persimmon vinegar. The powder of No. 2 blending ratio had a good flowing characteristic due to addition of gum arabic, which prevents moisture-absorption of the powder when the power were spray dried. Also, the powder of No. 2 blending ratio had little burnt taste and smell due to addition of cyclodextrin, and had quite fresh taste and smell. But, in case of the powder of No. 2 blending ratio, the concentration of total solids was 52.9° BX, which was very high, and the powder solution had a high viscosity. Thus, when spray dried with atomizer, the solution of No. 2 blending ration formed long and fine threads, thereby reticular particles, which had a relatively low specific gravity being formed in the solution. On the other hand, persimmon vinegar having No. 3 blending ratio comprised relatively small amounts of lactose, gum arabic, and cyclodextrin, which were more expensive than other excipients, and had a low concentration of total solids. Thus, when spray dried using atomizer, the persimmon vinegar having No. 3 blending formed few of the threads, and was suitable to be pulverized (good powderable characteristic).

The persimmon vinegar of No. 4 blending ratio was spray dried, in order to confirm cyclodextrin's entraping effects of taste and smell. As the result, the vinegar of No. 4 blending ratio showed a worse powderable characteristic, and still less characteristic smell and fresh taste of persimmon leaf when examined in sensory test, compared with the No. 2 blending ratio. These confirmed that cyclodextrin had to be added to the vinegar of No. 4 blending ratio, in order to preserve taste and smell of persimmon vinegar appropriately. In order to prevent a forming of reticular particles in the vinegar of No. 2 blending ratio, the Nos. 5, 6, and 7 blending ratios, to which extract of persimmon leaf had been added, were spray dried. As the result, as the content of the extract of persimmon leaf were increased, hygroscopic property of the dried powder was diminished and its flowing property was improved, which lead to an overall improvement in powderable characteristic. The reason that addition of the extract leads improvement in powderable characteristic seemed to be the fact that the extract contains a significant amount of amylaceous polymers such as excipients which help the extract to be spray dried easily. When 30% of 15° BX concentrate of persimmon leaf were added to powder, the powder showed a characteristic smell of persimmon leaf, but it also showed a bitter taste. Therefore, it was confirmed that concentration of the concentrate suitable to be added was about 20%.

In conclusion, since the powder, which absorbs less moisture and has a heavy specific gravity, flowing property, and very good powderable characteristic and appropriate sour taste, was considered better, the Nos. 6 and 7 blending ratios seemed to be suitable to prepare persimmon vinegar powder. Since No. 7 blending ratio had a characteristic bitter taste of persimmon leaf, No 6 blending ratio seemed to be optimal.

EXAMPLE 4

The Preparation of Persimmon Vinegar Powder Having the Optimal Blending Ratio Persimmon vinegar powder having an optimal blending ratio (confirmed in Example) was prepared and analyzed for physicochemical property. Also, sensory evaluation was performed in the powder. 20 g of 15° BX extract of persimmon leaf and 7.5 g of cyclodextrin were added to the 80 g of 15° BX concentrate of persimmon vinegar to obtain a solution. The solution was stirred with stirrer at 20° C. for 2 hours, and then 2.5 g of lactose, 32.5 g of maltodextrin and 7.5 g of gum arabic were dissolved in the stirred solution. The solution was homogenized with homogenizer at 20° C. for 5 minutes and pulverized with spray drier.

It should be understood that various alternatives to the embodiments of the invention described herein may be employed in practicing the invention. It is intended that the following claims define the scope of the invention and that construction within the scope of these claims and their equivalents are covered thereby.

THE EFFECT OF THE INVENTION

The present invention relates to persimmon vinegar powder and method for preparing the same, in which the persimmon vinegar is concentrated to obtain a concentrate of persimmon vinegar, extract of persimmon leaf and other excipients are added to the concentrate, and the obtained concentrate is pulverized. According to the present invention, a sour taste of persimmon vinegar is eliminated and a characteristic flavor of persimmon leaf is added, which lead to prepare persimmon vinegar powder having improved preference, and also prepare standard and economical persimmon vinegar powder by use of the concentrate. The method may prepare vinegar powders from vinegar, which is made from numerous fruits and vegetables such as grape, apricot, plum, garlic, etc. In some cases, Chineses matrimony vine, Maximowiczia chinensis and pine needle may be added.

The invention claimed is:

1. A method for preparing persimmon vinegar powder, comprising the steps of the following:

concentrating a persimmon vinegar to 12~18° BX in a vacuum concentrator to obtain a concentrate of persimmon vinegar;

adding 15~30 weight % of extract of persimmon leaf and 5~9 weight % of cyclodextrin, based on weight of the concentrate, to the concentrate to obtain a solution and then stirring the solution at 0~30° C. for 30~180 minutes, wherein the extract of persimmon leaf is prepared by steaming persimmon leaves at 100~120° C. for 1~10 minutes, drying it for 1~2 hours using a hot blast at 35~50° C., adding 8~12 liter/kg (dried persimmon leaves) of water to the dried leaves, extracting the leaves at 90~100° C. for 10~30 minutes, compression filtering the extract to obtain a liquid, and then concentrating the liquid to 12~18° BX;

dissolving 1~5 weight % of lactose, 25~35 weight % of maltodextrin, and 5~9 weight % of gum, based on weight of the concentrate, in the stirred solution and homogenizing the solution at 0~30° C. for 2~10 minutes, wherein the gum is at least one selected from the group consisting of carrageenan, agar, alginate, guar gum, gum arabic, locust bean gum, xanthan gum, pectin and carboxymethyl cellulose; and spray drying the homogenized solution using spray drier while the homogenized solution being infused into the spray drier at the rate of 20~40 ml/min, under conditions of inlet air temperature of 150~180° C., outlet air temperature of 80~100° C. and atomizer speed of 15,000~25,000 rpm, so as to obtain a powder.

2. Persimmon vinegar powder prepared by the method according to claim 1.

* * * * *